US006607230B2

(12) United States Patent
Voves

(10) Patent No.: US 6,607,230 B2
(45) Date of Patent: Aug. 19, 2003

(54) MOVEABLE SUPPORT SYSTEM FOR A CROSSOVER BOX

(76) Inventor: Mark A. Voves, 24662 100th St., Cresco, IA (US) 52136

( * ) Notice: Subject to any disclaimer, the term of this patent is extended or adjusted under 35 U.S.C. 154(b) by 0 days.

(21) Appl. No.: 10/350,662

(22) Filed: Jan. 24, 2003

(65) Prior Publication Data

US 2003/0111860 A1 Jun. 19, 2003

Related U.S. Application Data

(60) Provisional application No. 60/351,692, filed on Jan. 25, 2002.

(51) Int. Cl.[7] ................................................. B60R 9/00
(52) U.S. Cl. ...................................... 296/37.6; 224/404
(58) Field of Search ......................... 296/37.6; 224/404, 224/548

(56) References Cited

U.S. PATENT DOCUMENTS

| 4,522,326 | A | * | 6/1985 | Tuohy, III | 224/310 |
| 5,037,153 | A | * | 8/1991 | Stark | 296/37.6 |
| 5,052,739 | A | * | 10/1991 | Irwin | 296/37.6 |
| 5,088,636 | A | * | 2/1992 | Barajas | 224/281 |
| 5,121,959 | A | * | 6/1992 | King | 296/37.6 |
| 5,685,593 | A | * | 11/1997 | O'Connor | 296/39.2 |
| 5,924,616 | A | * | 7/1999 | Shives | 224/404 |
| 6,116,673 | A | * | 9/2000 | Clonan | 296/37.6 |
| 6,264,083 | B1 | * | 7/2001 | Pavlick et al. | 224/404 |
| 6,354,647 | B1 | | 3/2002 | Voves | |

* cited by examiner

Primary Examiner—Joseph D. Pape

(57) ABSTRACT

A moveable support system for a crossover toolbox having a pair of rails mounted to the sidewalls of a truck. The system also includes a pair of channel shaped members secured to the lower part of the tool box having wheels rotatably mounted in the recess area of the channel for movably mounting the toolbox on the rails. The channel also has a lip element extending inwardly from one side. This lip is engaged by a horizontal flange member of the rails so that the wheels are secured on top of the rails.

3 Claims, 5 Drawing Sheets

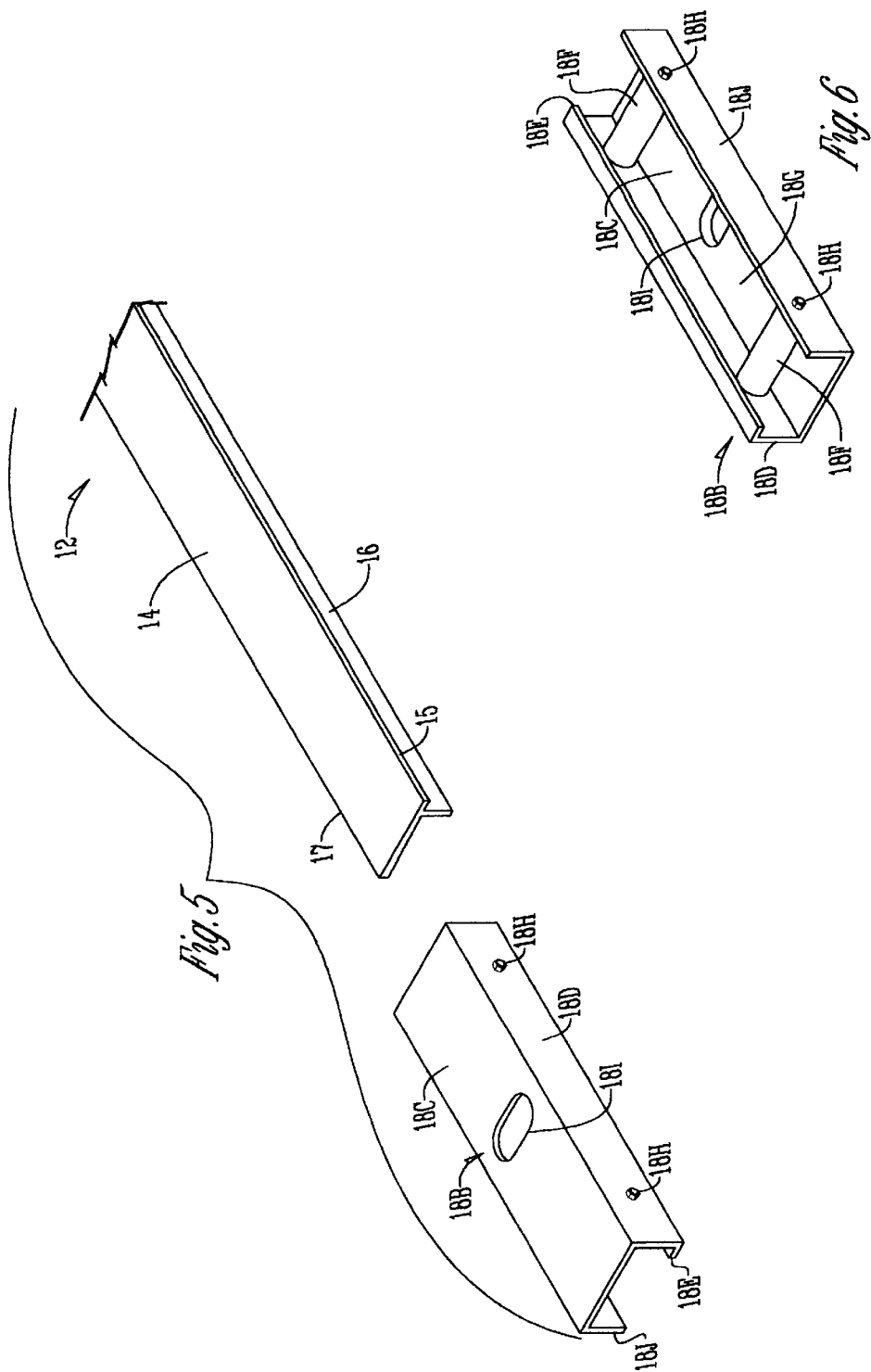

MOVEABLE SUPPORT SYSTEM FOR A CROSSOVER BOX

CROSS REFERENCE TO RELATED APPLICATION

This application is a continuation of Provisional Application Serial No. 60/351,692 filed Jan. 25, 2002.

BACKGROUND OF THE INVENTION

This invention relates to a moveable support system for mounting a variety of accessories upon the bed of a pick-up truck, and more particularly to a moveable support system for mounting a crossover tool box.

There exist a variety of devices for mounting accessories to the bed of a pick-up truck. Some of these devices include rail systems for slidably mounting tool boxes between the side walls of the bed. Not only are these devices complicated in their structure and difficult to assemble and operate, but they are not easily adapted to fit truck beds of different shapes and sizes.

Therefore, a primary objective of this invention is to provide a moveable support system that is easily adapted to truck beds of different shapes and sizes.

A further objective of the present invention is to provide a moveable support system that is easy and economical to manufacture having a minimum of machined parts.

A still further objective of this invention is to provide a moveable support system that is easy to assemble and operate.

A still further objective of this invention is to provide a moveable support system for a crossover box wherein the box cannot be inadvertently removed from the support system.

These and other objects will be apparent to those skilled in the art.

SUMMARY OF THE INVENTION

A moveable channel support system has an inverted U-shaped channel member that has a top and a first and second side. The channel shaped member has a recess opening between its sides wherein wheels are rotatably mounted in a lateral position. A first side of the channel member has an inwardly extending lip. The system also has a pair of elongated rails that are attached to the truck sidewalls and supported by a vertical member. A flange extends beyond this vertical member and extends into the space of the channel member that is between the wheels and the extending lip. The second side of the channel extends past the side edge of the rail allowing the wheels to be secured on top of the rails. A crossover toolbox can then be mounted on the top of the channel shaped member.

BRIEF DESCRIPTION OF THE DRAWINGS

FIG. 5 is an exploded perspective view of a support block and the rail upon which it is supported;

FIG. 6 is a bottom perspective view of the support block of FIG. 5;

DETAILED DESCRIPTION OF THE INVENTION

Figure 1:
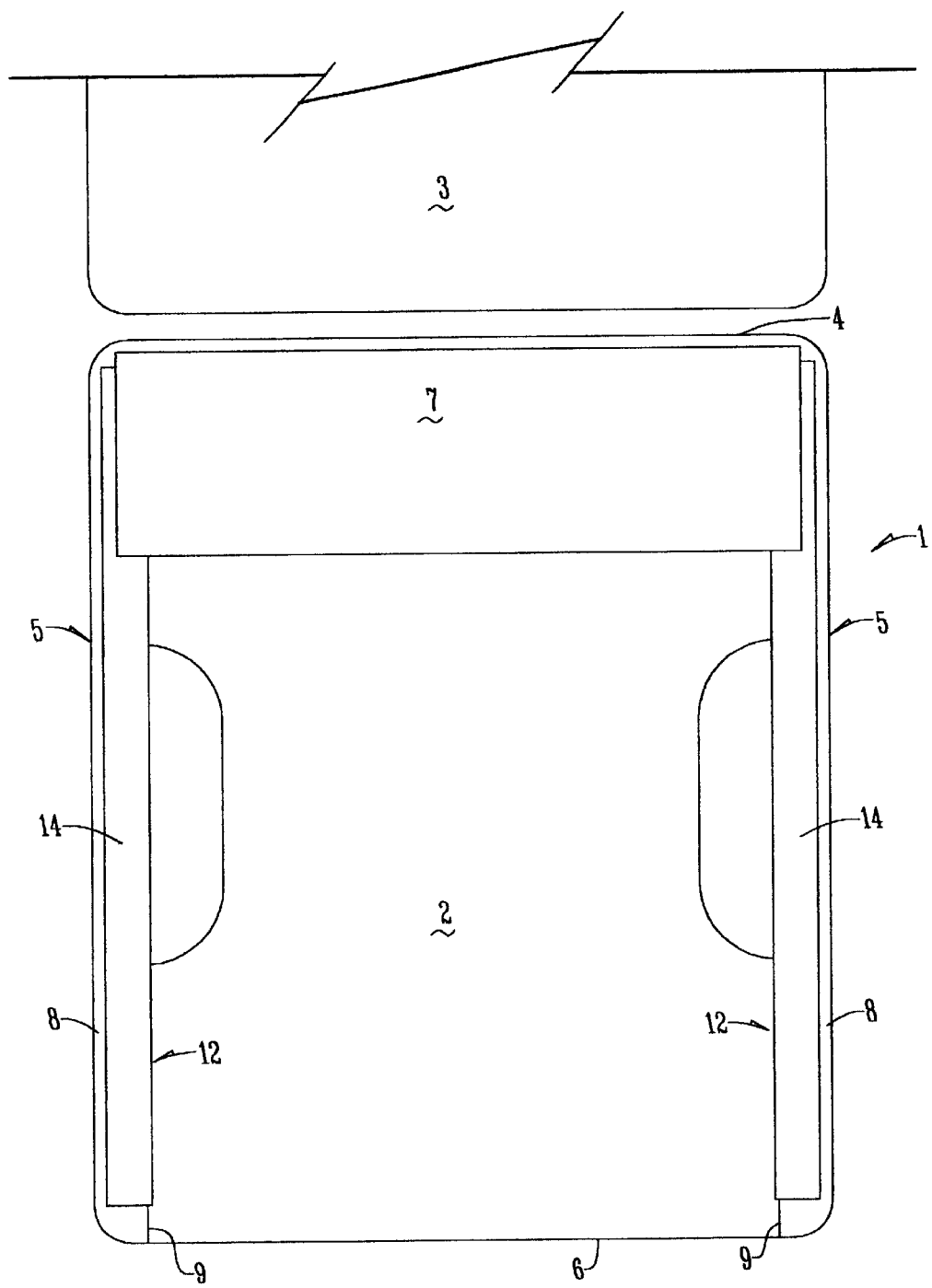
FIG. 1 is a partial top plan view of the crossover box of this invention mounted on a truck bed.
Figure 2:
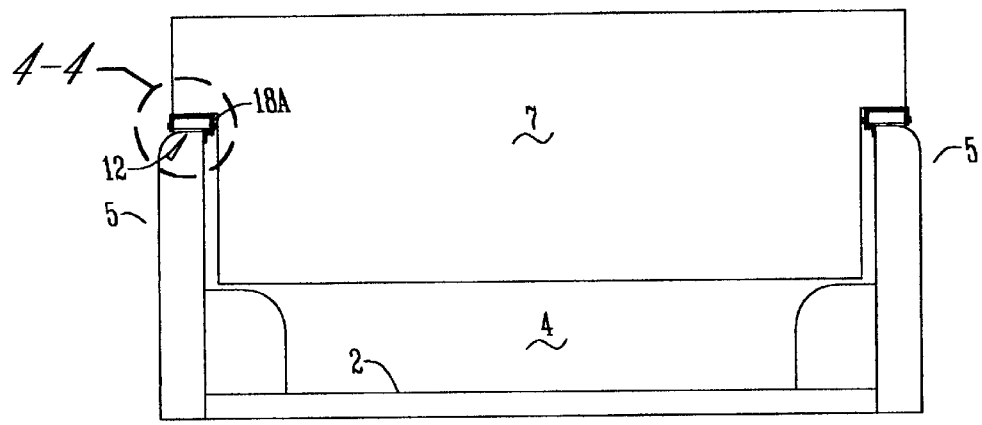
FIG. 2 is a sectional view of FIG. 1 taken along line 2—2 showing the moveable support system.
Figure 3:
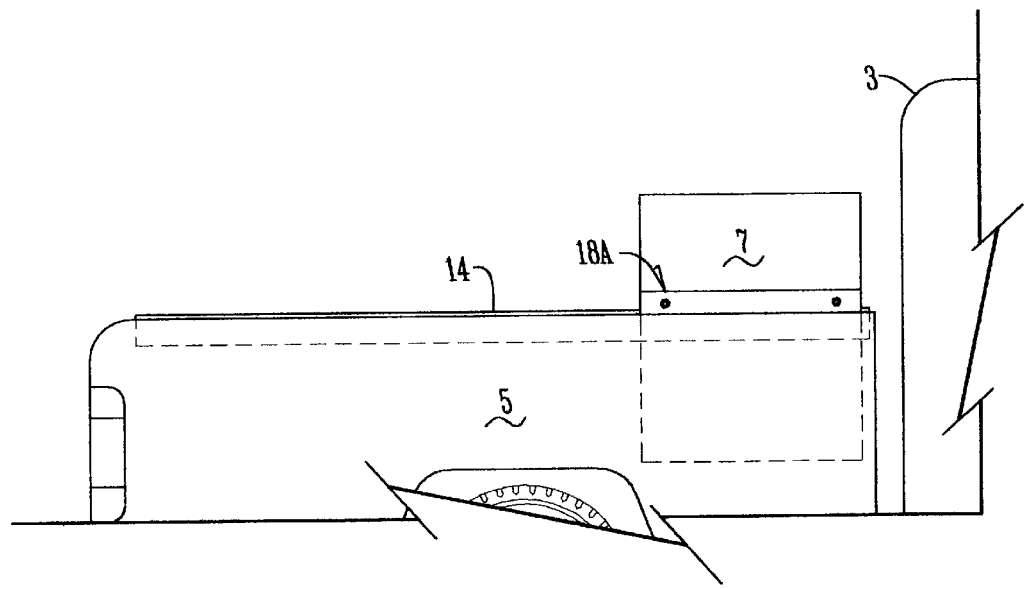
FIG. 3 is a side elevational view of the moveable support system of FIG. 1.

Referring to FIGS. 1–3, a standard pick-up truck 1 has a conventional bed 2 mounted upon a truck chassis behind the truck cab 3. As illustrated in FIG. 1, the bed includes a front wall 4, a pair of side walls 5, and a tail gate 6. The sidewalls of modern pick-up beds vary widely in width and shape making it difficult to adapt a standard supporting system for the different sizes. Shown in FIGS. 1–3 is a conventional crossover box 7. While this description outlines a moveable support system for a crossover box, the system can be adapted to other truck accessories.

A pair of rails 12 are mounted to the truck sidewalls 5. The rails 12 include an elongated plate 14 that extends across the top surface 8 of the truck sidewall and a vertical support member 16 that extends downwardly from the plate 14 and engages an inner edge 9 of the truck sidewall 5. Generally, vertical support member 16 is a flange. The rails 12 are mounted to the truck sidewalls either through the plate 14 to the top surface 8 of the sidewalls 5 or through the vertical support member 16 to the inner edge 9 of the sidewalls 5, or both, in any conventional manner. While the rails can be made of a variety of materials, preferred is a fiber reinforced, internally lubricated and UV stabilized HDPE.

Figure 4:
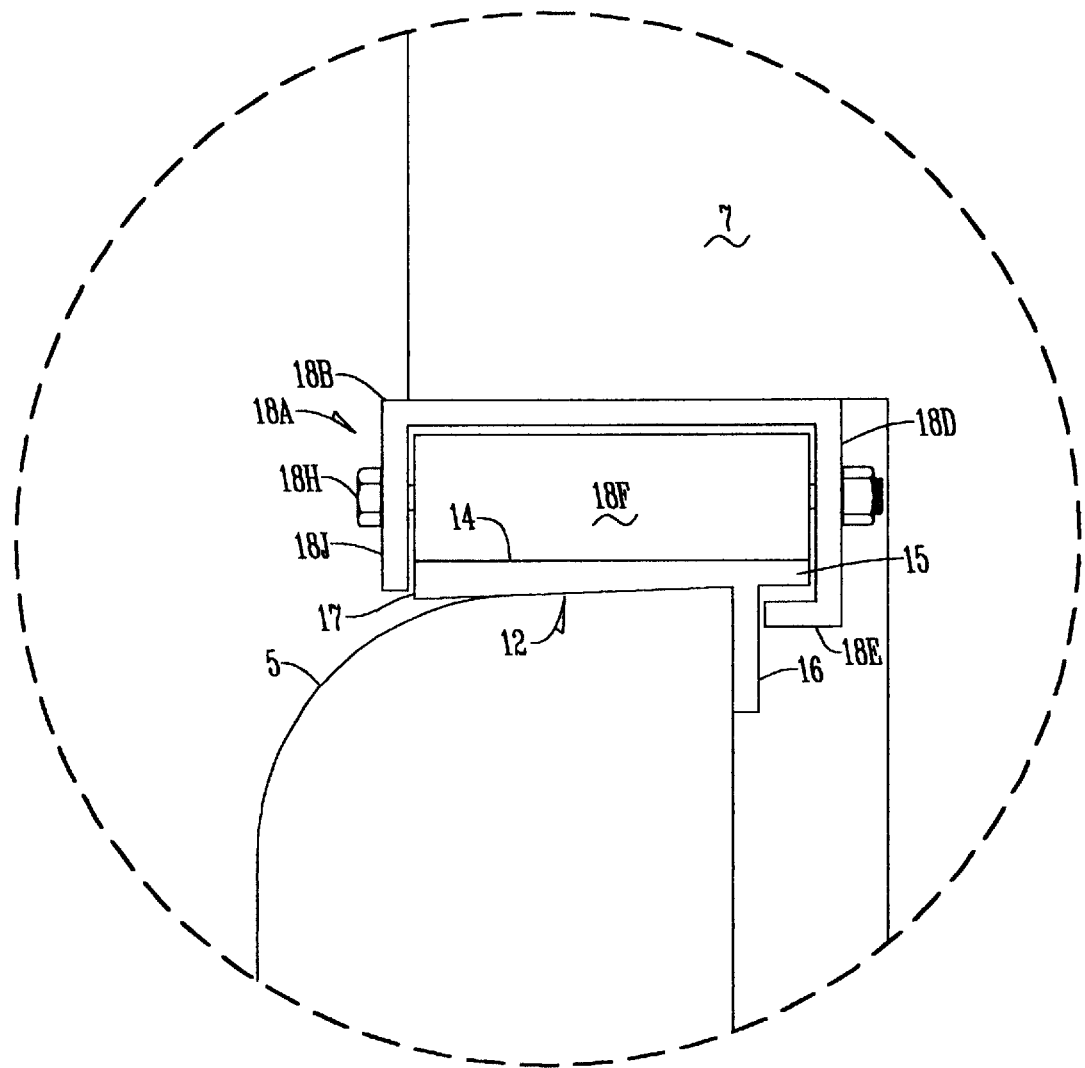
FIG. 4 is an enlarged scale sectional view of the support system taken on line 4—4 of FIG. 2.

FIG. 4 shows an enlarged scale sectional view of the channel support system 18A taken on line 4—4 of FIG. 2. From this view one can see how the channel support system 18A operates. Crossover box 7 rests on top of channel support 18B. Channel 18B has rollers 18F that extend laterally across the width of the channel 18B. Rollers 18F are supported by pins 18H. The rollers 18F engage elongated plate 14 of rail 12 allowing crossover box 7 to move forward and backward. Channel 18B has sides 18D and 18J. Side 18D has an inwardly extending lip 18E which extends under a side edge 15 of the plate 14 on one of the rails 12. This arrangement of structure will prevent the box from bouncing off of the rails when the truck upon which the box is mounted is in transit. Side 18J slidably engages the side 17 of plate 14 on rail 12.

It should be appreciated that this design allows the channel support system 18A to secure the rail 12 so that lateral movement is prevented. This ensures that the rollers 18F of channel support system 18A will remain on top plate 14 of the rails 12.

FIG. 5 shows the individual components of the channel support system 18A in a perspective view. Channel 18B has a top flat portion 18C and opposite sides 18D and 18J which normally extend downwardly from the side edges of top 18C. One of the sides 18D has an inwardly extending lip 18E. Top flat portion 18C has a transverse slot 18I. Slot 18I runs parallel with the rollers allowing the channel support system 18A to be moved laterally to accommodate the width of the particular truck bed 2 being used. Therefore, the bolt can be positioned at any desired location in slot 18I to accommodate trucks of different widths.

Rail 12 has a top plate 14, and a vertical support member 16 extending downwardly from top plate 14. Top plate 14 has a flange 15 that extends outwardly beyond vertical support member 16. Top plate 14 also has a side 17. It should be appreciated that channel 18B has been designed to slidably engage the rail 12 to form channel support system 18A.

FIG. 6 shows a perspective view of the bottom of channel 18B. A pair of rollers 18F extend laterally across the elongated center space 18G of channel 18B and are rotatably supported by pins 18H supported by sides 18D and 18J. The rollers 18F extend downwardly to engage top plate 14.

Figure 7:
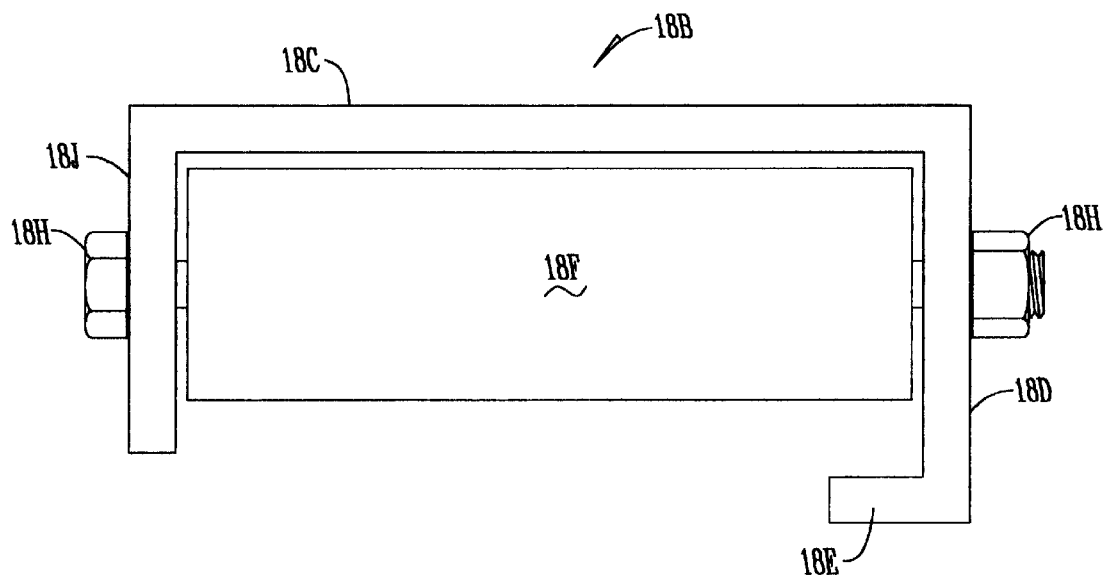
FIG. 7 is a sectional end view of the support block of FIG. 5.
Figure 8:
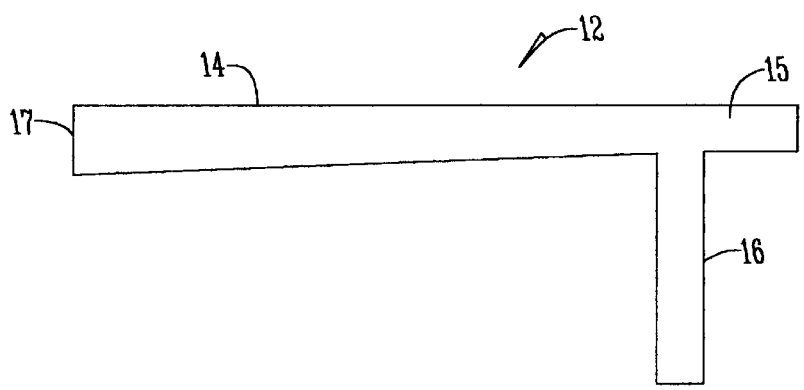
FIG. 8 is a sectional end view of the rail of FIG. 5.

FIGS. 7 and 8 are sectional views of channel 18B and rail 12. Separated one can see that side 18D of channel 18B is designed to have an extending lip 18E that can capture side edge 15 of rail 12. Side 17 is designed to have a greater height and taper down to the height of side edge 15. This allows extending lip 18E to engage side edge 15 at the same time side 18J slidably engages side 17.

Because of the design of the channel support system, the system can be easily assembled to any pick up truck because the channel 18B can be secured to the tool box at any lateral width to accommodate the space between the tracks or rails on the upper edges of the sides of the track box. The lateral length of the wheels or rollers facilitates this possibility. Therefore, a consumer can purchase a different pickup truck, but still use the same channel support system. Consequently, the present channel support system not only facilitates the assembly and use of a mounting support system, but it is also economical of manufacture.

It is therefore seen that this invention will achieve at least all of its stated objectives.

What is claimed is:

1. A moveable support system for a crossover tool box that extends over the sidewalls of a truck comprising:

a pair of elongated rails mounted to the truck sidewalls, the rails including an elongated plate that extends across the top surface of the truck sidewalls and a vertical support element on an inner side of the plate for engaging an inner edge of the truck sidewalls;

a horizontal flange on the elongated plate extending inwardly beyond the vertical element;

a channel shaped member having a top and a first and second sides with a lip element extending inwardly from the first side; and with a recess opening between the sides, wheels rotatably mounted in the recess opening and engaging the top surface of the rails; and the horizontal flange on the elongated plate extending into the space between the inwardly extending lip and the wheels.

2. The support system of claim 1 wherein the wheels are elongated rollers.

3. A moveable support system for a crossover tool box that extends over the sidewalls of a truck comprising:

a pair of elongated rails mounted to the truck sidewalls, the rails including an elongated plate that extends across the top surface of the truck sidewalls and a vertical support element on an inner side of the plate for engaging an inner edge of the truck sidewalls;

a pair of channels attached to a bottom of the crossover box to engage the elongated plate of the rails; and wheels rotatably mounted to the channels and engaging the top surface of the rails.

* * * * *